United States Patent
Blaney et al.

(10) Patent No.: US 10,968,772 B2
(45) Date of Patent: Apr. 6, 2021

(54) ATTACHMENT BLOCK FOR BLADE OUTER AIR SEAL PROVIDING CONVECTION COOLING

(71) Applicant: United Technologies Corporation, Farmington, CT (US)

(72) Inventors: Ken F. Blaney, Middleton, NH (US); Thomas E. Clark, Sanford, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 54 days.

(21) Appl. No.: 16/042,096

(22) Filed: Jul. 23, 2018

(65) Prior Publication Data
US 2020/0025029 A1 Jan. 23, 2020

(51) Int. Cl.
*F01D 25/14* (2006.01)
*F01D 11/12* (2006.01)
*F01D 25/12* (2006.01)

(52) U.S. Cl.
CPC .............. *F01D 25/14* (2013.01); *F01D 11/12* (2013.01); *F01D 25/12* (2013.01); *F05D 2240/11* (2013.01); *F05D 2260/201* (2013.01); *F05D 2260/202* (2013.01); *F05D 2300/6033* (2013.01)

(58) Field of Classification Search
CPC ..................................................... F01D 11/12
See application file for complete search history.

(56) References Cited

U.S. PATENT DOCUMENTS

| 4,679,981 A * | 7/1987 | Guibert ................... F01D 11/08 415/116 |
| 6,758,653 B2 * | 7/2004 | Morrison ................... F01D 9/04 415/116 |
| 8,147,192 B2 | 4/2012 | Jones et al. |

(Continued)

FOREIGN PATENT DOCUMENTS

| EP | 1676981 A2 * | 7/2006 | ............. F01D 25/12 |
| EP | 1676981 A2 | 7/2006 | |

(Continued)

OTHER PUBLICATIONS

European Search Report for EP Application No. 19187958A dated Jan. 8, 2020.

(Continued)

*Primary Examiner* — Juan G Flores
(74) *Attorney, Agent, or Firm* — Carlson, Gaskey & Olds, P.C.

(57) ABSTRACT

A gas turbine engine includes a compressor section and a turbine section. The turbine section includes at least one turbine rotor having a radially extending turbine blade. The turbine section is rotatable about an axis of rotation. A blade outer air seal is positioned radially outwardly of a radially outer tip of the at least one turbine blade. The blade outer air seal has axially spaced forward and aft portions and a central web between the axially spaced portions. An attachment block is supported on structure within the engine. The attachment block mounts the blade outer air seal. A passage extends into a chamber within the attachment block, and communicates to circumferential edges of the attachment block to direct cooling air along the central web of the blade outer air seal. A blade outer air seal assembly is also disclosed.

18 Claims, 4 Drawing Sheets

(56) References Cited

U.S. PATENT DOCUMENTS

| | | | |
|---|---|---|---|
| 8,246,299 B2 * | 8/2012 | Razzell | F01D 11/005 |
| | | | 415/173.1 |
| 8,303,247 B2 | 11/2012 | Schlichting et al. | |
| 8,814,507 B1 * | 8/2014 | Campbell | F01D 25/14 |
| | | | 415/173.1 |
| 9,938,846 B2 | 4/2018 | Freeman et al. | |
| 10,443,425 B2 | 10/2019 | Romanov et al. | |
| 10,487,678 B2 | 11/2019 | Tyler, Jr. et al. | |
| 2009/0155051 A1 * | 6/2009 | Lee | F01D 25/08 |
| | | | 415/115 |
| 2014/0023490 A1 | 1/2014 | Hillier | |
| 2016/0333784 A1 | 11/2016 | Jones et al. | |
| 2016/0348526 A1 * | 12/2016 | Vetters | F01D 25/246 |
| 2017/0145845 A1 | 5/2017 | Vetters et al. | |
| 2017/0175572 A1 | 6/2017 | Vetters | |
| 2018/0073391 A1 | 3/2018 | Jennings | |
| 2018/0087405 A1 | 3/2018 | Quennehen et al. | |

FOREIGN PATENT DOCUMENTS

| | | | | |
|---|---|---|---|---|
| EP | 1965033 A2 * | 9/2008 | | F01D 25/246 |
| EP | 1965033 A2 | 9/2008 | | |
| GB | 2244523 A | 12/1991 | | |

OTHER PUBLICATIONS

European Search Report for EP Application No. 19187956.8 dated Apr. 1, 2020.

* cited by examiner

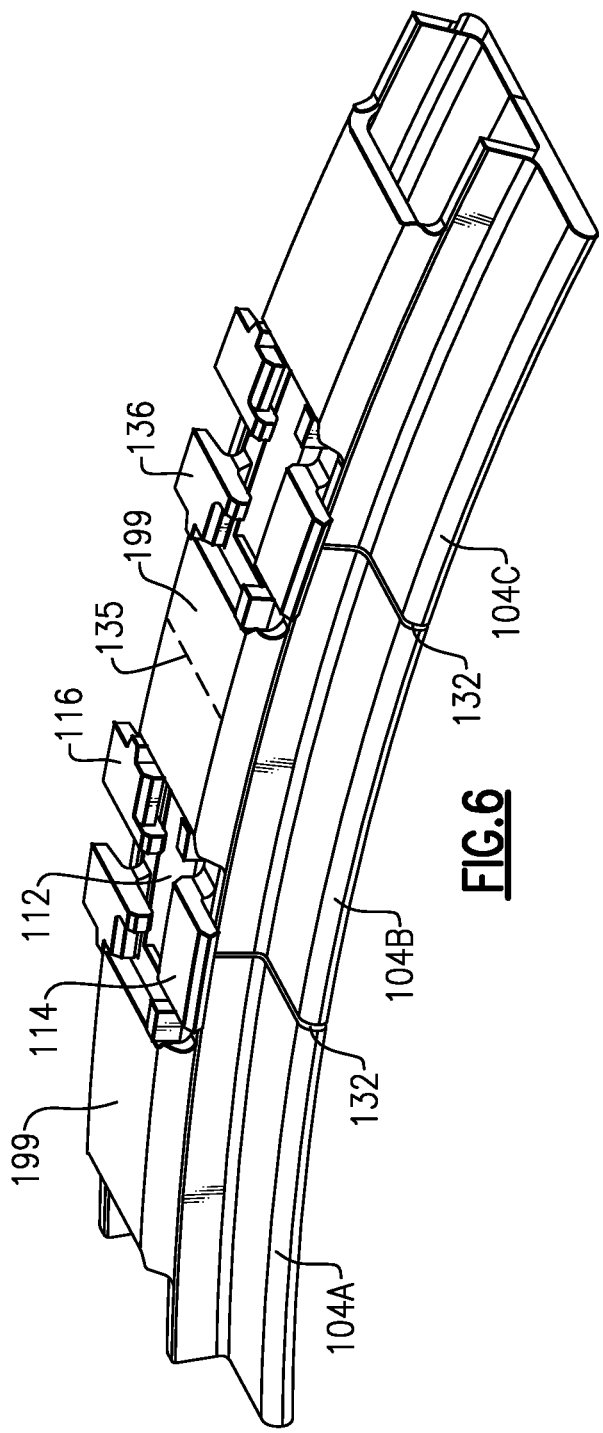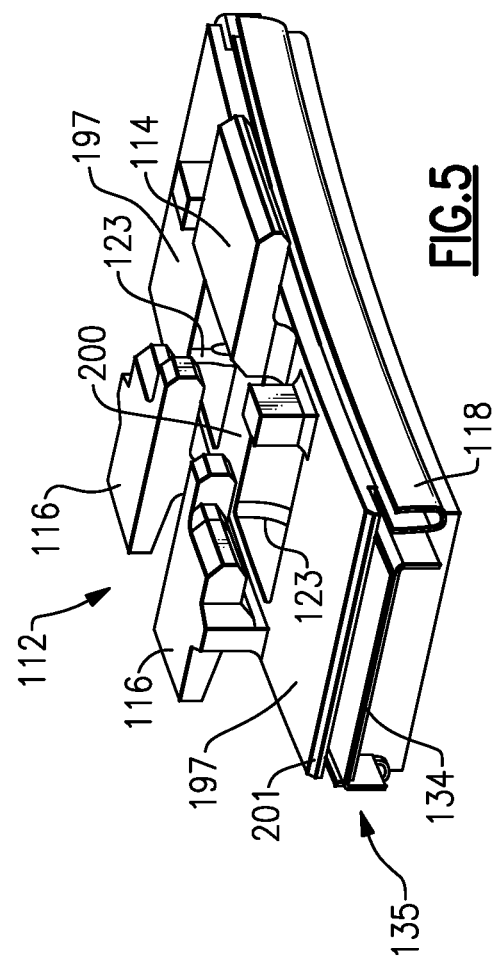

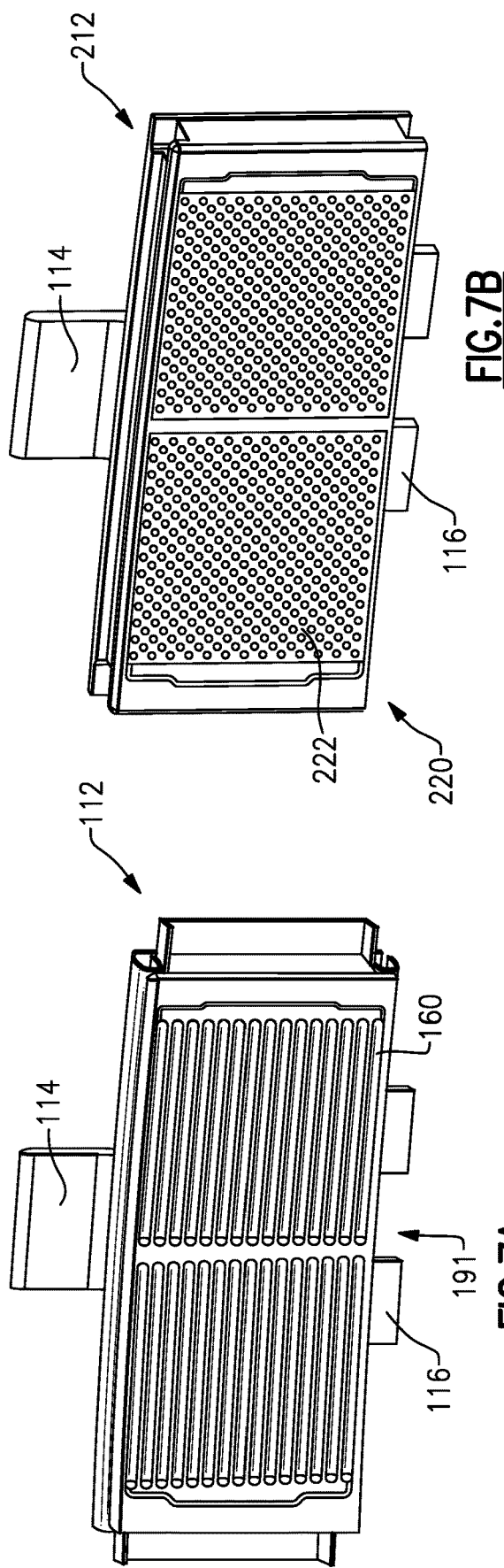

ATTACHMENT BLOCK FOR BLADE OUTER AIR SEAL PROVIDING CONVECTION COOLING

BACKGROUND

This application relates to an attachment block for a blade outer air seal which provides convection cooling.

Gas turbine engines are known and generally include a fan delivering air into a bypass duct as propulsion air. Air is also delivered into a compressor where it is compressed and delivered into a combustions section. In the combustion section, the compressed air is mixed with fuel and ignited.

Products of this combustion pass downstream over turbine rotors, driving them to rotate. The turbine rotors generally include turbine blades which are impacted by the products of combustion to drive the turbine blades and, hence, the rotors.

The efficiency of gas turbine engines is an area of much design effort. It is desirable that as much of the products of combustion as possible be guided across the turbine blades.

Thus, it is known to provide blade outer air seals ("BOAS") spaced radially outwardly of a radially outer tip of the turbine blades. This minimizes leakage.

SUMMARY

In a featured embodiment, a gas turbine engine includes a compressor section and a turbine section. The turbine section includes at least one turbine rotor having a radially extending turbine blade. The turbine section is rotatable about an axis of rotation. A blade outer air seal is positioned radially outwardly of a radially outer tip of the at least one turbine blade. The blade outer air seal has axially spaced forward and aft portions and a central web between the axially spaced portions. An attachment block is supported on structure within the engine. The attachment block mounts the blade outer air seal. A passage extends into a chamber within the attachment block, and communicates to circumferential edges of the attachment block to direct cooling air along the central web of the blade outer air seal.

In another embodiment according to the previous embodiment, the chamber includes circumferentially extending fingers communicating with the passage, such that air may pass into the passage, and then circumferentially into the circumferentially extending fingers, and then through cooling holes at the circumferential edges of the attachment block and along the central web.

In another embodiment according to any of the previous embodiments, the circumferentially extending fingers each communicate with a separate inlet, with a central web separating the separate inlets.

In another embodiment according to any of the previous embodiments, there are a plurality of circumferentially spaced blade outer air seals and a plurality of circumferentially spaced attachment blocks.

In another embodiment according to any of the previous embodiments, cooling air after having been directed along the central web of the blade outer air seal passes radially inwardly through the circumferential gaps between adjacent ones of the blade outer air seals.

In another embodiment according to any of the previous embodiments, a gap seal spans a circumferential gap between the circumferential edges of adjacent ones of the attachment blocks.

In another embodiment according to any of the previous embodiments, there are axial seals associated with a forward end and an aft end of the attachment block, and sealing against a forward and rear surface of the blade outer air seal.

In another embodiment according to any of the previous embodiments, the axial seals at the forward and aft end of the attachment block are generally C-shaped.

In another embodiment according to any of the previous embodiments, the gap seals span the circumferential gap between adjacent ones of the attachment blocks are feather seals.

In another embodiment according to any of the previous embodiments, there are heat transfer enhancement features provided at a radially inner face of the attachment block.

In another embodiment according to any of the previous embodiments, the heat transfer enhancement features include at least one of circumferentially extending ribs, trip strips extending in opposed direction in axially spaced groups or pedestals extending radially inwardly from the radially inner face of the attachment block.

In another embodiment according to any of the previous embodiments, the attachment block is formed of a base metal.

In another embodiment according to any of the previous embodiments, the heat transfer enhancement features are formed in a coating deposited on the base metal.

In another embodiment according to any of the previous embodiments, the blade outer air seal is formed of a ceramic matrix composite.

In another featured embodiment, a blade outer air seal assembly includes a blade outer air seal having axially spaced portions and a central web between the axially spaced portions and formed of a ceramic matrix composite. An attachment block is supported on structure within an engine. The attachment block mounts the blade outer air seal. A passage extends into a central chamber within the attachment block, and communicates with cooling holes through a radially inner face of the attachment block to direct cooling air at the central web of the blade outer air seal.

In another embodiment according to the previous embodiment, the chamber includes circumferentially extending fingers communicating with the passage, such that air may pass into the passage, and then circumferentially into the circumferentially extending fingers, and then through cooling holes at the circumferential edges of the attachment block and along the central web.

In another embodiment according to any of the previous embodiments, the circumferentially extending fingers each communicating with a separate inlet, with a central web separating the separate inlets.

In another embodiment according to any of the previous embodiments, there are a plurality of circumferentially spaced blade outer air seals and a plurality of circumferentially spaced attachment blocks.

In another embodiment according to any of the previous embodiments, cooling air after having been directed along the central web of the blade outer air seal passing radially inwardly through the circumferential gaps between adjacent ones of the blade outer air seals.

In another embodiment according to any of the previous embodiments, a gap seal spans a circumferential gap between the circumferential edges of adjacent ones of the attachment blocks.

These and other features may be best understood from the following drawings and specification.

BRIEF DESCRIPTION OF THE DRAWINGS

FIG. 5 shows further details.
FIG. 6 is an assembly view.
FIG. 7A shows a first embodiment.
FIG. 7B shows a second embodiment.
FIG. 7C shows a third embodiment.

DETAILED DESCRIPTION

Figure 1:
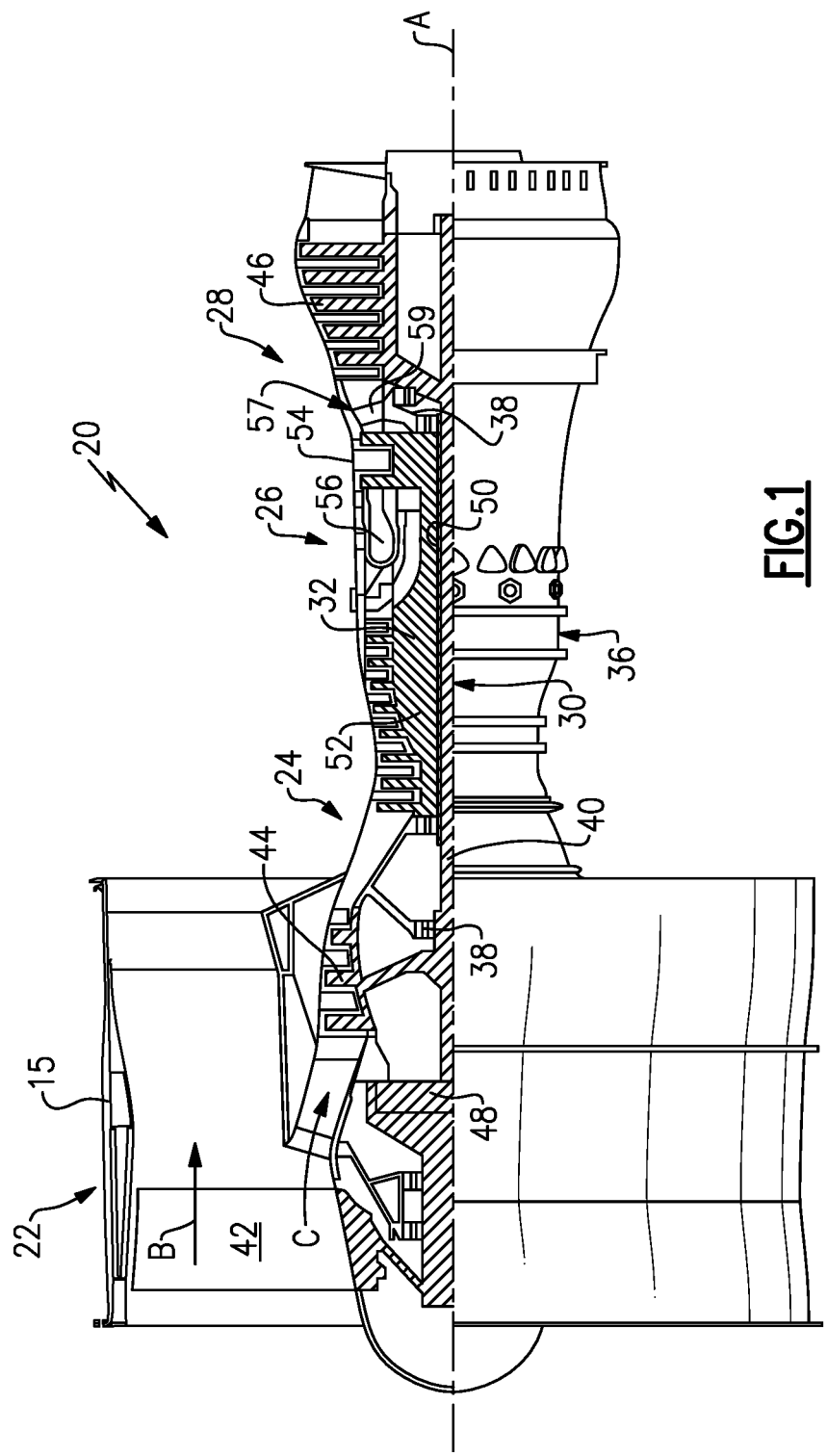
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
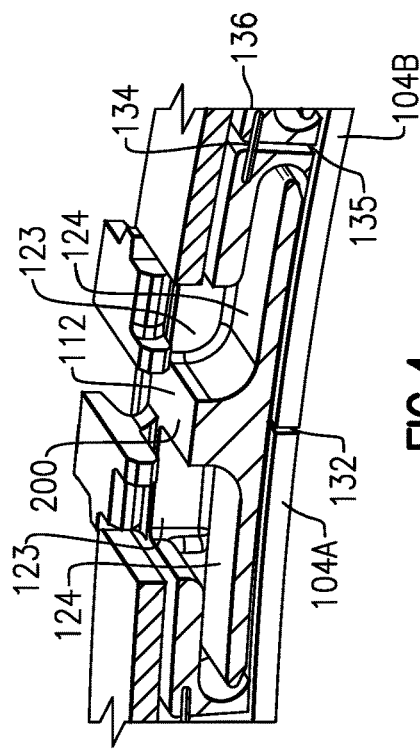
FIG. 2 shows a portion of a turbine section.

FIG. 2 shows a turbine section 100. A blade 102 has a radially outer tip 103 spaced from a blade outer air seal ("BOAS") 104. The BOAS 104 is shown to have axially forward and aft portions 106 and 108, and a central web 99 between the portions 106 and 108. An attachment block 112 receives seals 118 to seal a chamber 120 between a radially inner surface of the attachment block 112 and a radially outer surface 121 of the central web 99

As shown in phantom at 98, static structure within the engine provides a mount surface to receive forward hook portions 114, and at least one aft hook portion 116 from the attachment block 112. The portions 106 and 108 are radially within hooks 114 and 116. An open space 110 allows air to move into the attachment block 112, as will be explained below.

An inner face 191 of the attachment block 112 has heat transfer enhancement surfaces, as will be explained below with regard to FIG. 7A-7C.

Figure 3:
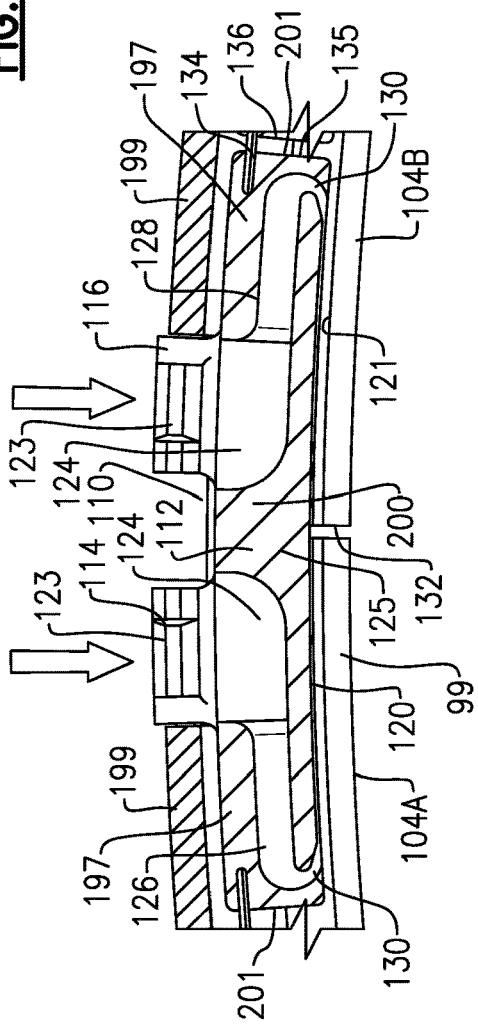
FIG. 3 is an assembly view.

Seals 118 are shown to be C-shaped seals. These act in combination with feather seals 134, as shown in FIG. 3, to seal the chamber 120 and ensure cooling air will flow along the web 99, to cool the BOAS 104. Alternative seals may be used, including w-shaped seals, rope seals and other shaped seals.

As shown in FIG. 3, air from the chamber 110 is able to pass into circumferentially extending fingers 124. There are two openings or passages 123 shown in this figure and a central web 200 between the fingers 124. Alternatively, it is possible for the air to flow in both circumferential directions without a central web 200. Further, air is shown flowing through the circumferentially extending fingers 124 to openings 130, which then extend radially inwardly from circumferential edges 201 of the attachment block 112 and along the central web 99.

Openings 130 can be plural holes, a single elongate slot, or other shapes. All such shapes will be referred to here as "cooling holes."

As can be appreciated from this figure, there are circumferential gaps 132 defined between adjacent BOAS 104A and 104B. The air, having passed in circumferentially opposed directions through the fingers 124, then extends, again, in circumferentially opposed directions, but now toward each other, along the web 99 until reaching the gaps 132 at which time it passes radially inwardly.

Outer mount structure 199 on BOAS 104A and 104B sit outwardly of circumferential support surfaces 197 on the attachment blocks 112 and 136.

Figure 4:
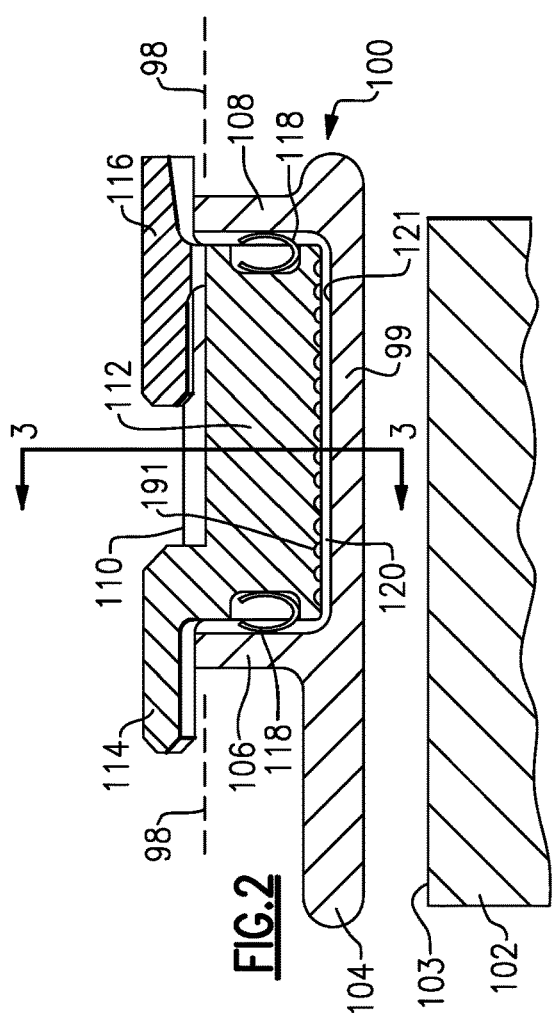
FIG. 4 shows a detail of the attachment block.

There are also gaps 135 between circumferential edges 201 of adjacent attachment blocks 112 and 136. Feather seals 134 span those gaps, as shown in FIG. 3 and also in FIG. 4. Notably, as is clear from FIGS. 3 and 4, the gaps 132 are circumferentially offset from the gaps 135, which minimizes leakage and maximizes the passage of the cooling air to provide convection cooling to the webs 99.

FIG. 5 shows details of an attachment block 112. As shown, the feather seals 134 extend beyond the circumferential edge 201. The seals 118 may also span the gap and could, in some embodiments, span the gap 135 to connect to an adjacent attachment block. In other embodiments, the seals 118 may be separate for each attachment block 112.

FIG. 6 shows adjacent BOAS 104A, 104B, and 104C and intermediate circumferential gaps 132. The axially extending hook portions 114 and 116 of adjacent attachment blocks 112 and 136 are also shown. There is a single forward hook 114 and two aft hooks 116. As an alternative there may be a plurality of forward hook 114 and a single aft hook 116. As also shown in phantom, the gaps 135 between the attachment blocks 112 and 136 are radially within outer mount structure 199, which is part of the BOAS.

FIG. 7A shows the radially inner face 191 of the attachment block 112. Heat transfer enhancement features 160 are shown. In this embodiment, the enhancement features include ribs 160, which extend in a circumferential direction.

FIG. 7B shows an attachment block 212 wherein the inner face 220 has heat transfer enhancement features formed as pedestals 222, which extend radially inwardly.

FIG. 7C shows an attachment block 312 having heat transfer enhancement features 320 including trip strips 322. The trip strips include opposed pairs of axially spaced ribs 325 and 326, which extend along a direction with a component in both an axial direction and in a circumferential direction, and said pairs 325 and 326 having opposed circumferential components in said directions.

The attachment blocks, as disclosed in this application, may be formed as a base metal. However, a coating that is, in particular, a coating which is compatible with ceramic matrix composite materials may be applied to the base metal to provide the heat transfer enhancement features.

The above-disclosed embodiment is particularly valuable for use with ceramic matrix composite BOAS.

A gas turbine engine according to this disclosure has a compressor section and a turbine section. The turbine section includes at least one turbine rotor having a radially extending turbine blade. The turbine section being rotatable about an axis of rotation. A blade outer air seal is positioned radially outwardly of a radially outer tip of the at least one turbine blade. The blade outer air seal has axially spaced forward and aft portions and a central web between said circumferentially the spaced portions. An attachment block is supported on structure within the engine. The attachment block mounts the blade outer air seal. At least one passage extends into a chamber within the attachment block, and communicates to circumferential edges of the attachment block to direct cooling air along the central web of the blade outer air seal.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a compressor section and a turbine section;
said turbine section including at least one turbine rotor having a radially extending turbine blade, and said turbine section being rotatable about an axis of rotation, and a blade outer air seal positioned radially outwardly of a radially outer tip of said at least one turbine blade, said blade outer air seal having axially spaced forward and aft portions and a central web between said axially spaced portions; and
an attachment block supported on structure within said gas turbine engine, and said attachment block mounting said blade outer air seal, and a passage extending into a chamber within said attachment block, and communicating to circumferential edges of said attachment block to direct cooling air along said central web of said blade outer air seal;
wherein said chamber including circumferentially extending fingers communicating with said passage, such that said cooling air passes into said passage, and then circumferentially into said circumferentially extending fingers, and then through cooling holes at said circumferential edges of said attachment block and along said central web.

2. The gas turbine engine as set forth in claim 1, wherein said circumferentially extending fingers each communicating with a separate inlet, with said central web separating said separate inlets.

3. The gas turbine engine as set forth in claim 1, wherein there are a plurality of circumferentially spaced blade outer air seals and a plurality of circumferentially spaced attachment blocks.

4. The gas turbine engine as set forth in claim 3, wherein cooling air after having been directed along said central web of said blade outer air seal passing radially inwardly through circumferential gaps between adjacent ones of said plurality of circumferentially spaced blade outer air seals.

5. The gas turbine engine as set forth in claim 4, wherein a gap seal spans one of said circumferential gaps between said circumferential edges of adjacent ones of said plurality of circumferentially spaced attachment blocks.

6. The gas turbine engine as set forth in claim 5, wherein there are axial seals associated with a forward end and an aft end of said plurality of circumferentially spaced attachment blocks, and sealing against a forward and rear surface of said plurality of circumferentially spaced blade outer air seals.

7. The gas turbine engine as set forth in claim 6, wherein said axial seals at said forward and aft end of said plurality of circumferentially spaced attachment blocks are generally C-shaped.

8. The gas turbine engine as set forth in claim 7, wherein said gap seal spanning one of said circumferential gaps between adjacent ones of said plurality of circumferentially spaced attachment blocks is a feather seal.

9. The gas turbine engine as set forth in claim 1, wherein there are heat transfer enhancement features provided at a radially inner face of said attachment block.

10. The gas turbine engine as set forth in claim 9, wherein said heat transfer enhancement features include at least one of circumferentially extending ribs, trip strips extending in opposed direction in axially spaced groups or pedestals extending radially inwardly from said radially inner face of said attachment block.

11. The gas turbine engine as set forth in claim 9, wherein said attachment block is formed of a base metal.

12. The gas turbine engine as set forth in claim 11, wherein said heat transfer enhancement features being formed in a coating deposited on said base metal.

13. The gas turbine engine as set forth in claim 1, wherein said blade outer air seal is formed of a ceramic matrix composite.

14. A blade outer air seal assembly comprising:
a blade outer air seal having axially spaced portions and a central web between said axially spaced portions and formed of a ceramic matrix composite; and
an attachment block to be supported on structure within an engine, and said attachment block mounting said blade outer air seal, and a passage extending into a central chamber within said attachment block, and communicating with cooling holes through a radially inner face of said attachment block to direct cooling air at said central web of said blade outer air seal;
wherein said chamber including circumferentially extending fingers communicating with said passage, such that said cooling air passes into said passage, and then circumferentially into said circumferentially extending fingers, and then through said cooling holes at circumferential edges of said attachment block and along said central web.

15. The blade outer air seal assembly as set forth in claim 14, wherein said circumferentially extending fingers each communicating with a separate inlet, with said central web separating said separate inlets.

16. The blade outer air seal assembly as set forth in claim 14, wherein there are a plurality of circumferentially spaced blade outer air seals and a plurality of circumferentially spaced attachment blocks.

17. The blade outer air seal assembly as set forth in claim 16, wherein said cooling air after having been directed along said central web of said blade outer air seal passing radially inwardly through circumferential gaps between adjacent ones of said plurality of circumferentially spaced blade outer air seals.

18. The blade outer air seal assembly as set forth in claim 17, wherein a gap seal spans said circumferential gaps between said circumferential edges of adjacent ones of said plurality of blade outer air seal attachment blocks.

* * * * *